(No Model.)

G. W. DESMOND.
NUT LOCK.

No. 330,471. Patented Nov. 17, 1885.

WITNESSES
W. M. Rheem
R. W. Bishop.

INVENTOR
George W. Desmond
By R. S. & A. P. Lacey
Attorneys.

UNITED STATES PATENT OFFICE.

GEORGE W. DESMOND, OF VENICE, NEW YORK.

NUT-LOCK.

SPECIFICATION forming part of Letters Patent No. 330,471, dated November 17, 1885.

Application filed July 18, 1885. Serial No. 171,948. (No model.)

*To all whom it may concern:*

Be it known that I, GEORGE W. DESMOND, a citizen of the United States, residing at Venice, in the county of Cayuga and State of New York, have invented certain new and useful Improvements in Double-Burred Bolts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is intended to improve the operation and increase the efficiency of that class of nuts known as "jam-nuts;" and it consists in the construction, combination, and arrangement of the several parts, as hereinafter fully described, and specifically pointed out in the claim.

Figure 1:
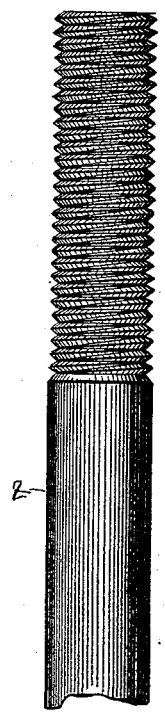
Figure 2:
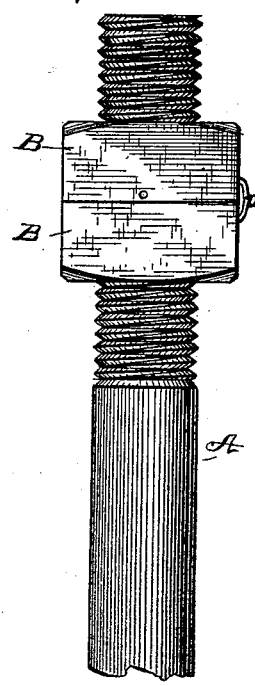
Figure 3:
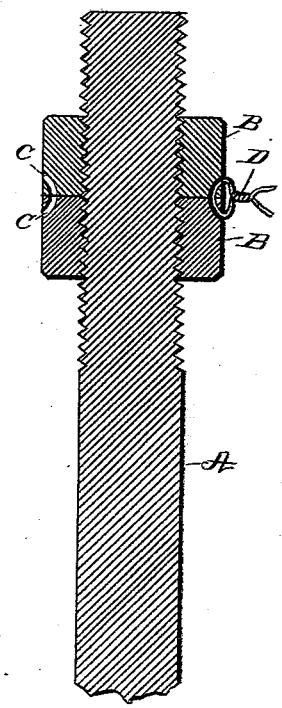

In the drawings, Figure 1 is a plan view of the bolt. Fig. 2 is a similar view showing the nuts in position. Fig. 3 is a sectional view.

A is the bolt, which may be of any desired length. Its screw-threaded end I provide with both right and left hand screw-threads, as shown. The bolt is made of the same diameter throughout, and the different screw-threads are given an equal pitch. The nuts B B are provided with coincident curved openings or passages C, through which a wire, D, is passed. The ends of this wire are twisted together after it has been passed through the passages C, and the two nuts are thus prevented from turning independently of each other. One of the nuts is provided with an internal right-handed screw-thread and the other with an internal left-handed screw-thread, in order that they may be both applied to the same bolt. It will be seen that this also prevents the nuts being turned off the bolt together. It makes no difference which nut is placed on the bolt first.

I am aware that bolts have been provided with right and left hand threads on their outer ends to receive right and left threaded nuts, said nuts being locked either by a key passed between them and entering a slot cut part way in the adjacent faces of each nut or by a key passed through an opening extending through the nuts parallel with their bore or threaded openings. Such constructions form no part of my invention, from which mine essentially differs in having the opening in each nut extend through its side and curve inward and outward through the body thereof and terminate at its face, so that when the nuts are screwed home the openings in each will coincide and form one continuous passage-way, through which a key or wire is inserted and its ends twisted together, thus securely locking the nuts in place. By having the openings extended from the side, thence through the body of the nut, the coincidence of the passage-way of each nut is easily determined. Thus when the openings on the side are in line the openings through the adjacent faces will also be in line and the passage in each register. Where the key passes through an opening formed by cutting a slot in the adjacent face of each nut, the nuts are not bound together, and, furthermore, the key is liable to accidental displacement, or may be easily removed by scheming persons. The same objection applies where the opening passes through the nuts parallel to their bore. Besides, it is difficult to tell when the opening in one nut coincides with the opening in the other nut.

Having thus described my invention, what I claim, and desire to secure by Letters Patent, is—

The combination, with the bolt A, having a right and left screw-thread cut on its outer end, of two nuts, the one provided with a right and the other with a left hand screw-thread, to correspond with the threaded end of the bolt, each nut having an opening or passage-way extending from its side and curving inwardly and outwardly through the body of the nut and terminating at its face, the opening in each nut coinciding to form one continuous curved passage-way when the nuts are screwed home, and a wire inserted through said passage, and having its ends twisted together, substantially as and for the purposes set forth.

In testimony whereof I affix my signature in presence of two witnesses.

GEORGE W. DESMOND.

Witnesses:
 R. CURTIS,
 C. A. JENNINGS.